United States Patent
Cattaruzzi (10) Patent No.: US 7,771,255 B2
(45) Date of Patent: Aug. 10, 2010

(54) PLANT AND METHOD FOR THE STUNNING AND KILLING OF ANIMALS FOR SLAUGHTER THROUGH ASPHYXIATION

(75) Inventor: Bruno Cattaruzzi, Brescia (IT)

(73) Assignee: Cattaruzzi International S.r.l., S. Zeno Naviglio, Brescia (IT)

( * ) Notice: Subject to any disclaimer, the term of this patent is extended or adjusted under 35 U.S.C. 154(b) by 1226 days.

(21) Appl. No.: 11/346,620

(22) Filed: Feb. 2, 2006

(65) Prior Publication Data

US 2006/0172673 A1 Aug. 3, 2006

Related U.S. Application Data

(63) Continuation-in-part of application No. 10/999,122, filed on Nov. 30, 2004, now abandoned.

(30) Foreign Application Priority Data

Jun. 25, 2004 (IT) .......................... BS2004A0075
Jun. 23, 2005 (EP) ................................ 05105615

(51) Int. Cl.
*A22B 3/00* (2006.01)
(52) U.S. Cl. ..................................... 452/57
(58) Field of Classification Search ................. 452/52, 452/57, 58, 66
See application file for complete search history.

(56) References Cited

U.S. PATENT DOCUMENTS

| | | | | | |
|---|---|---|---|---|---|
| 2,588,770 | A | * | 3/1952 | Sadler | 600/21 |
| 3,548,447 | A | * | 12/1970 | Price, Jr. | 452/52 |
| 4,829,635 | A | * | 5/1989 | Tonnies | 452/57 |
| 5,104,352 | A | * | 4/1992 | Dransfield | 452/198 |
| 5,653,629 | A | * | 8/1997 | Audsley et al. | 452/66 |
| 6,135,872 | A | * | 10/2000 | Freeland et al. | 452/66 |
| 6,537,145 | B1 | * | 3/2003 | Derouin et al. | 452/54 |
| 7,377,844 | B2 | * | 5/2008 | Kildegaard | 452/66 |
| 7,438,637 | B2 | * | 10/2008 | Zachariassen et al. | 452/66 |

FOREIGN PATENT DOCUMENTS

| | | |
|---|---|---|
| DE | 8701791 | 7/1988 |
| EP | 0680259 | 11/1995 |
| NL | 9201430 | 3/1995 |

* cited by examiner

*Primary Examiner*—Thomas Price
(74) *Attorney, Agent, or Firm*—Shoemaker and Mattare (57) ABSTRACT

A plant for the stunning and/or slaughter of animals for slaughter includes a hermetically sealable chamber with an entrance aperture for the introduction of live animals and an exit aperture for removal of stunned or slaughtered animals, closure devices to hermetically seal these apertures, and an extraction means to remove air from the chamber in order to stun or kill the animals.

16 Claims, 7 Drawing Sheets

PLANT AND METHOD FOR THE STUNNING AND KILLING OF ANIMALS FOR SLAUGHTER THROUGH ASPHYXIATION

DESCRIPTION

This invention refers to a plant and method for the stunning or slaughtering of farmyard animals such as chickens, turkeys, ducks, geese, pheasants, and rabbits destined for slaughter.

The methods currently used to stun and/or slaughter animals for slaughter include electrocution, shooting, electronarcosis, concussion and exposure to carbon dioxide.

An example of gas use to stun or slaughter poultry is described in patent no. EP 0 680 259 B1. This system, although advantageous for its efficiency and ability to reduce the damage which birds sometimes incur by flapping their wings, also has some inconveniences:
- the presence of dangerous gas storage plants in or around the slaughterhouse;
- the high construction cost of such plants, which makes their utilisation difficult for small and medium sized companies;
- the need to take considerable precautions in plant management, especially in the case of forced interruptions to the processing line;
- loss of all animals already slaughtered following a breakdown of the gas plant, due to the impossibility of immediate intervention inside the gas chamber;
- difficulty in correct calculation of the quantity of gas to pump into the gas chamber in proportion to the animals' weight.

The aim of the present invention is to supply a stunning and slaughtering method with the advantageous characteristics of the systems utilising gas but with none of the above-mentioned defects.

This aim is achieved with a plant in accordance with claim 1.

The characteristics and advantages of the plant of the invention will be more easily understood from the description below of its preferred embodiments, in conjunction with the appended indicative and non-limiting drawings, in which.

Figure 1:
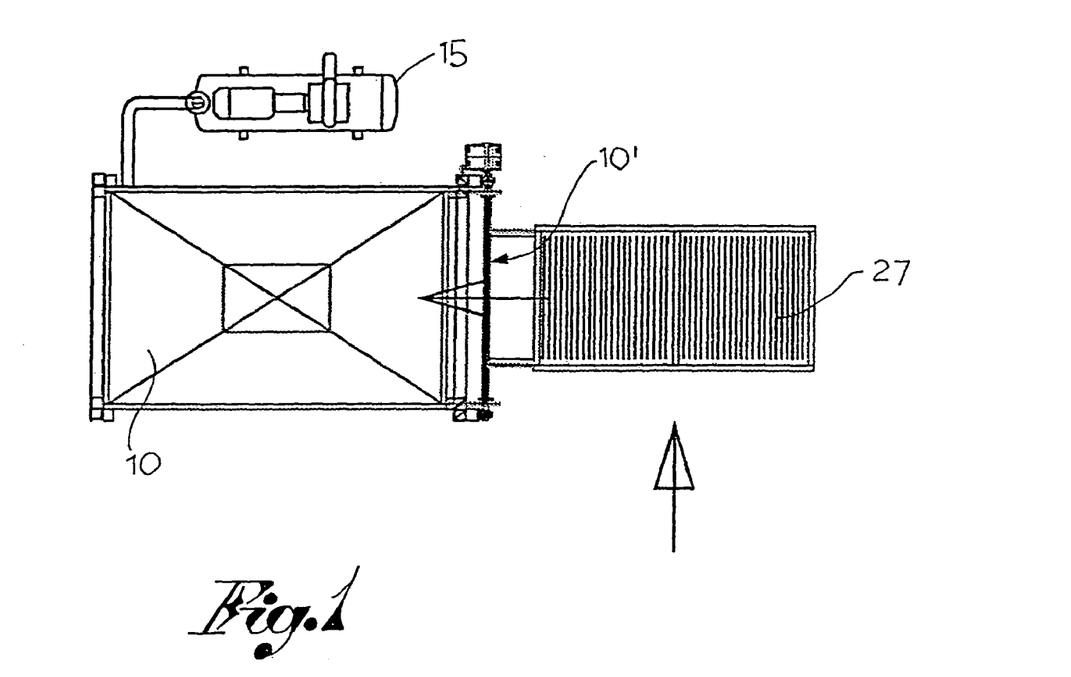
FIG. 1 gives a schematic view from the top of the plant in an initial layout.
Figure 2:
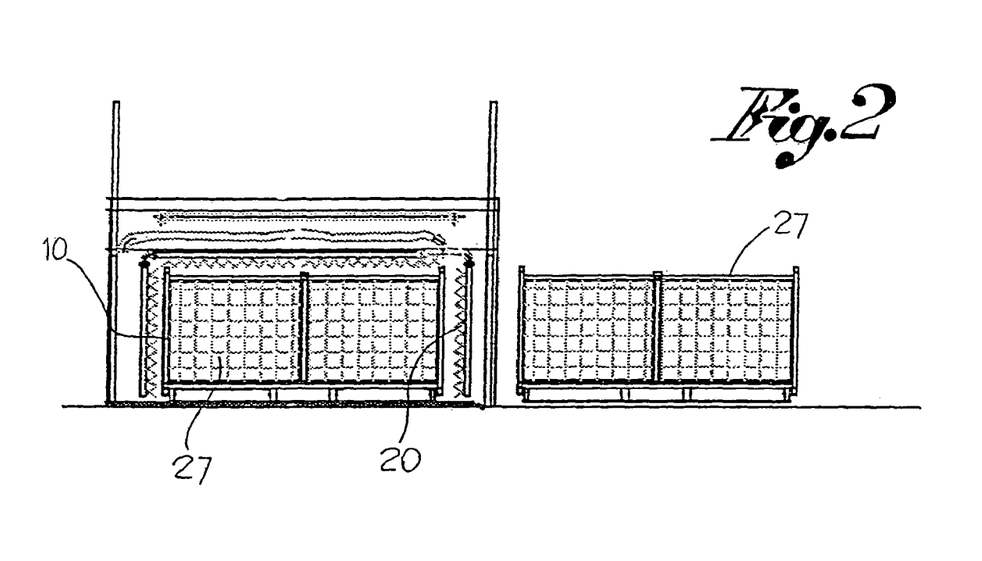
FIG. 2 shows the plant from the side.

In its general layout, as illustrated in FIGS. 1 and 2, the stunning and/or slaughter plant for animals for slaughter described in this invention comprises a hermetically sealable chamber 10 with at least one aperture 10' for introduction of live animals and removal of stunned or slaughtered animals, devices for hermetic sealing of said aperture/s, and an extraction means 15 communicating with and extracting air from said chamber in order to stun or slaughter the animals.

Preferably, the chamber 10 has an entrance aperture 11 for introduction of live animals and an exit aperture 12 for removal of stunned or slaughtered animals, each aperture having its respective closure device 13, 14.

In this case, the bottom of the hermetically sealable chamber 10 ideally consists of a motorised conveyor 17 capable of transporting the animals from entrance 11 to exit 12. This allows the simultaneous loading of live animals into and removal of stunned or slaughtered animals from the chamber 10.

The animals may be introduced into the plant enclosed in a single large pen 27, or in a succession of smaller pens 16, or loose.

Where animal movement is in a line of pens 16 or loose, the hermetically sealable chamber is in the form of a tunnel.

Advantageously, in order to automate the phases of animal loading into the chamber 10, stunning and/or slaughter and removal, the live animals are transported from a loading zone (not shown) to the hermetically sealable chamber entrance aperture 12 by a motorised entrance conveyor 18. In the same way, the stunned or slaughtered animals are transported to the exit aperture 12 by a motorised exit conveyor 19.

Where the single large pen 27 is utilised, it can be simply inserted and removed from the chamber 10 with a lift truck.

Figure 3:
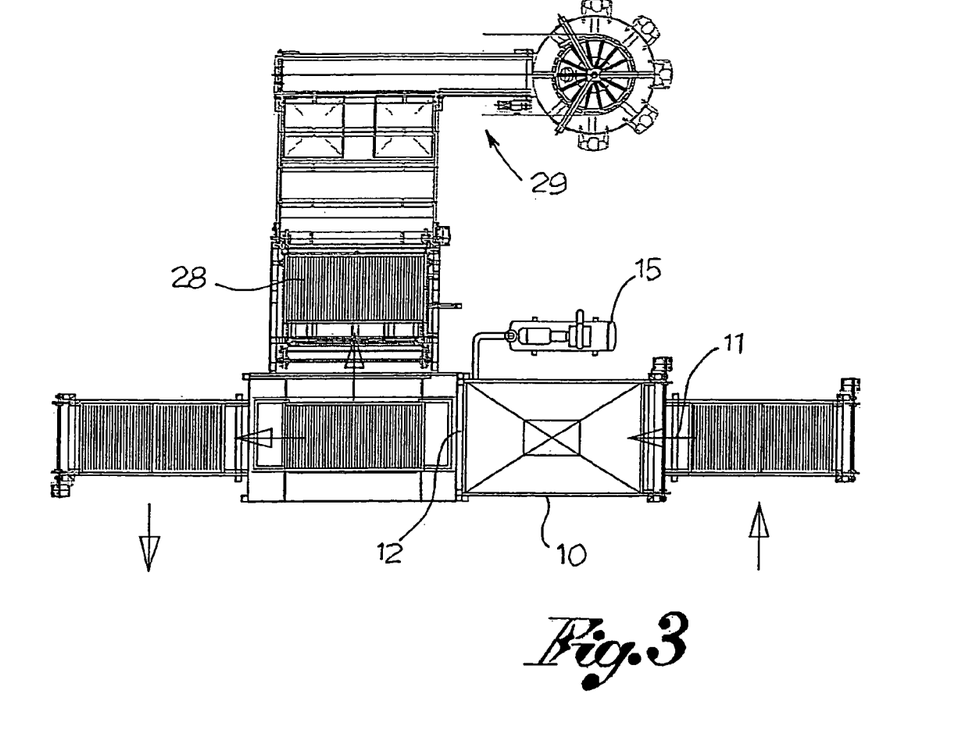
FIG. 3 gives a schematic view from the top of the plant in a second layout.
Figure 4:
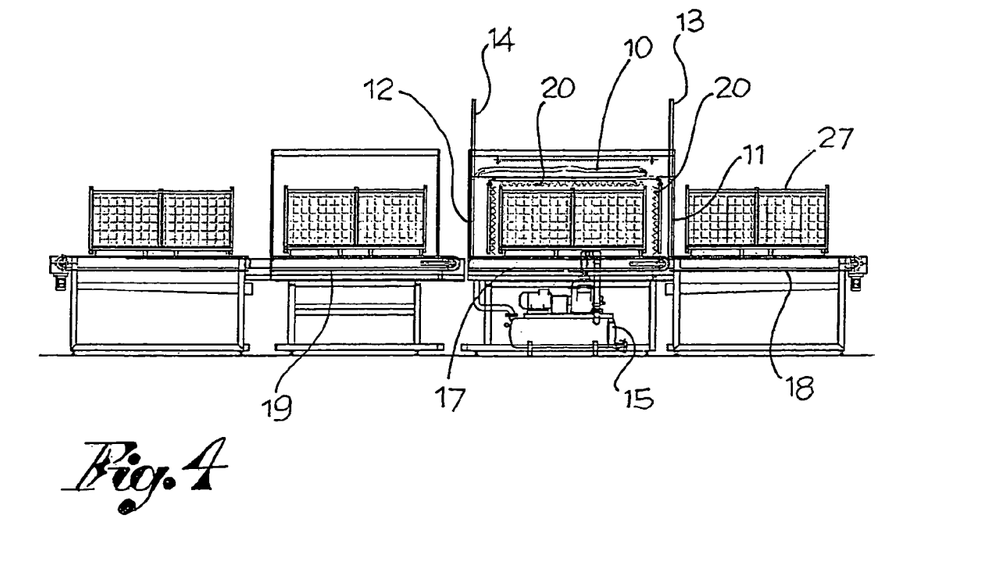
FIG. 4 shows the plant from the side.
Figure 5:
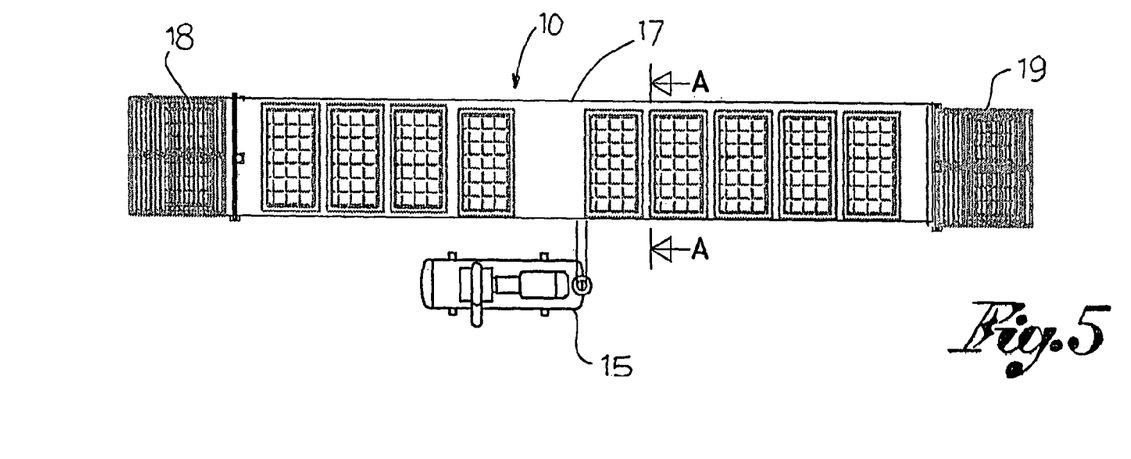
FIG. 5 gives a schematic view from the top of the plant in a third layout.
Figure 6:
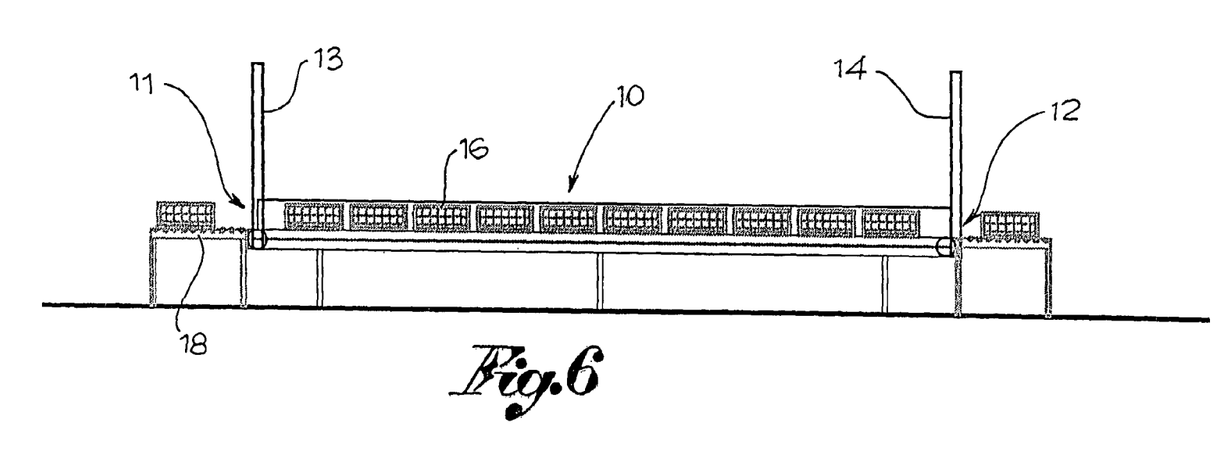
FIG. 6 shows the plant in FIG. 5 from the side.
Figure 7:
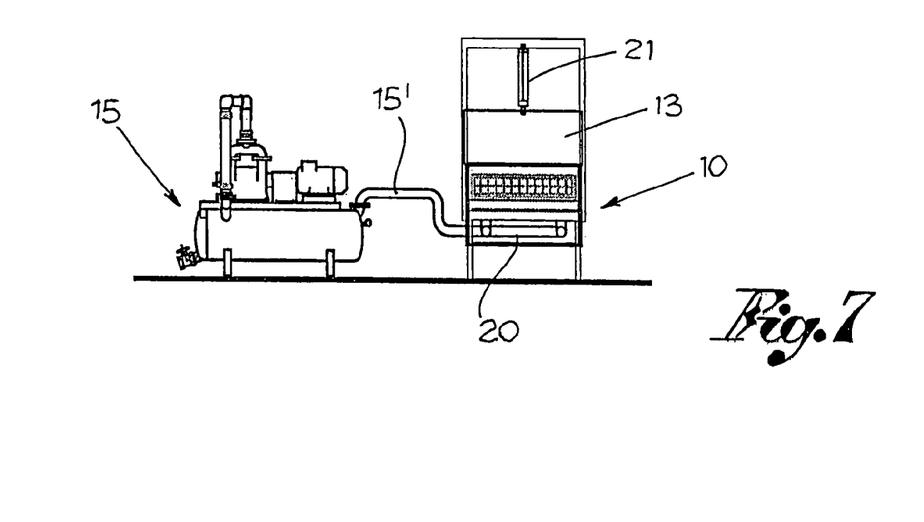
FIG. 7 shows a cross section of the plant across the line A-A in FIG. 5.

In the layout shown in FIGS. 1-4, for example, the hermetically sealable chamber 10 is designed to hold one or more large pens 27 simultaneously. In FIGS. 3 and 4, the large pens 27 are introduced into the chamber by a motorised entrance conveyor 18 and removed by the motorised exit conveyor 19. Once removed, each large pen 27 is activated to turn on its side to unload the slaughtered animals onto a third motorised conveyor 28 serving a hanging line 29.

In accordance with the preferred layout, numerous perforated pipelines 20 connected to the extraction means 15 are positioned inside the hermetically sealable chamber 10. These perforated pipelines 20 run along the entire hermetically sealable chamber 10 and are distributed along its floor, side walls and ceiling.

The extraction means 15 comprises, for example, an electric pump connected to the perforated pipelines by a duct 15'.

In the layout shown in FIGS. 1-7, the aperture closure devices 13 and 14 are in the form of a rolling shutter.

Figure 8:
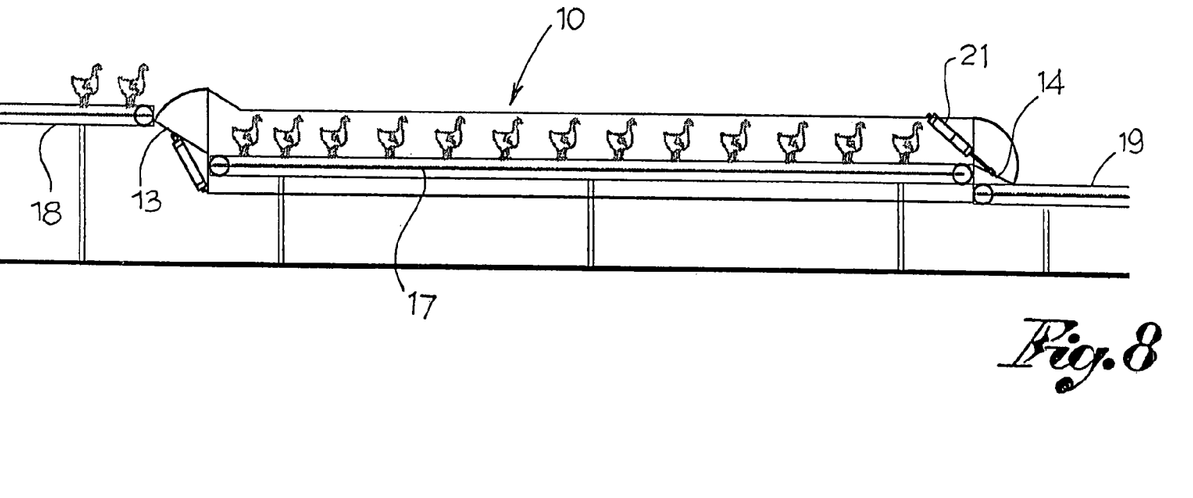
FIG. 8 gives a view from the sides of the various plant layouts in FIGS. 5-7.
Figure 9:
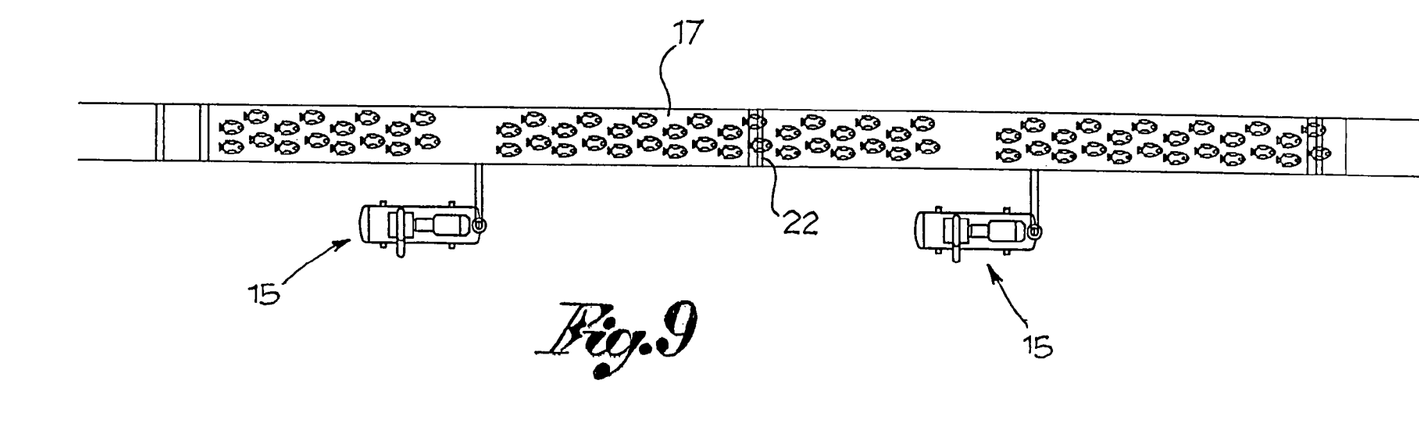
FIG. 9 gives a schematic view from the top of the plant of a fourth layout.
Figure 10:
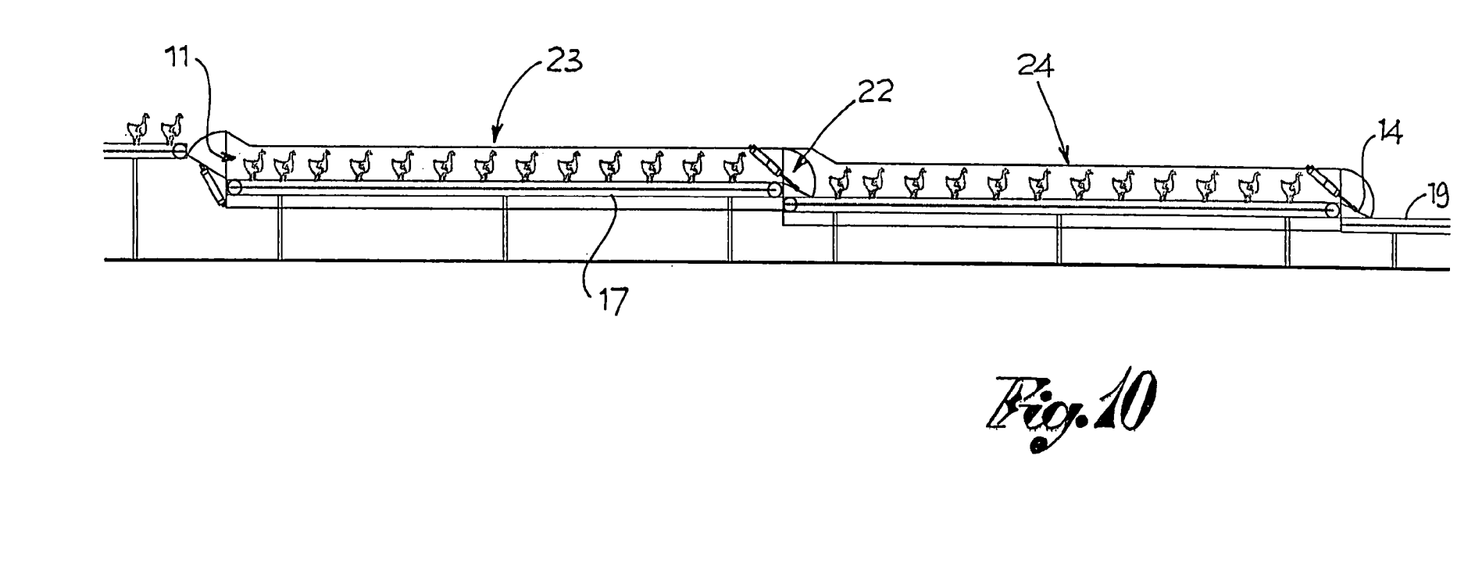
FIG. 10 shows the plant in FIG. 9 from the side.

Alternatively, as shown in FIGS. 8-10, the closure devices 13 and 14 may be in the form of pivoting plates which can be activated to rotate between a raised position, or closure of apertures 11 and 12, and a lowered position, or opening of the connection between the motorised conveyors 18, 17, 19. The latter may be, for example, belt conveyors. In this case, to facilitate animal throughput, especially where they are introduced loose into the plant, the motorised entrance 18 and exit 19 conveyors are positioned respectively above and below the motorised conveyor 17 of the sealable chamber 10 (FIG. 8).

As another alternative, the entrance and exit closure devices may be of a revolving door type, allowing a continuous throughput of animals through the hermetically sealable chamber 10.

In any case, the closure devices 13, 14 are ideally actioned using electric, pneumatic or hydraulic commands 21.

The animal stunning and/or slaughter method using the above described plant thus involves the introduction of the animals into the sealable chamber 10, closure of the entrance and exit apertures and activation of the extraction means to create a vacuum within the chamber 10. Tests effected have demonstrated that a vacuum of 60 mm Hg maintained for 120 seconds will cause the death of the animals, which can then be immediately sent to the hanging area for the subsequent throat-cutting and blood draining phases. Ideally, while the stunned or slaughtered animals are being removed from the sealable chamber 10, other live animals are simultaneously introduced into the chamber.

If required by the overall abattoir capacity, i.e. if its hourly production requires a number of animals greater than that exiting the stunning/slaughter plant, to avoid dead time due to the animals' stay in the sealable chamber under vacuum conditions for the pre-established time, the stunning/slaughter plant can be set up in such a way as to optimise loading, air extraction from the hermetically sealable chamber and removal, in order to achieve the greatest possible throughput of animals to the hanging zone.

Specifically, if N is the number of animals that the processing line after the stunning/slaughtering plant is able to process in one unit of time, and T is the time necessary to stun/slaughter the animals, to enable the continuous operation of the processing line without interruption the sealable chamber must be big enough to contain at least N*T animals (ignoring for the sake of simplicity the time needed to transfer the stunned or slaughtered animals exiting the sealable chamber to the hanging line).

In this way, there will always be stunned or slaughtered animals ready to be supplied to the hanging line.

Nevertheless, in contrast to the plants utilised to date, the need to hermetically seal the chamber from which air is extracted means that continuous throughput of animals from the entrance to the exit of the stunning/slaughter by asphyxiation plant is not possible. Even in the above cited case, in which the capacity of the stunning/slaughter plant allows the hanging line to be re-supplied without interruptions, there is the inconvenience that the newly stunned or slaughtered animals are not immediately hung on the processing line but wait for a time up to the time T necessary for stunning/slaughter. This situation may not be acceptable for correct animal processing, which requires the shortest time possible between the animal's death and its throat-cutting and blood-draining.

The set-up solutions to avoid this problem employ a number of hermetically sealable chambers serving the same hanging line, each one with a capacity lower than the N*T capacity defined above. These chambers can be activated independently with a temporal sequence dependent on their number and capacity. Increasing the number of hermetically sealable chambers reduces the maximum waiting time for animals to be hung on the processing line.

For example, again referring to the T and N values defined above, using two chambers each with capacity T*N/2 animals, the second chamber can be activated at T/2 time after the first is activated. The maximum waiting time for animals exiting the chamber is thus reduced from T to T/2.

In the layout shown in FIGS. 9 and 10, the hermetically sealable chamber 10 is supplied with at least one intermediate closure device 22 suitable for dividing at least two compartments 23, 24, connected in cascade and hermetically separable from one another.

It is thus possible to introduce the first group of animals into the first compartment 23, close all the closure devices 13, 14 and 22 and activate the extraction means 15. After time T' less than that necessary to stun or slaughter the animals, the intermediate closure device 22 is opened so that the first group of animals can be transferred to the second compartment 24. The intermediate closure device 22 is then re-closed and the entrance aperture 11 opened. A second group of animals can now be introduced into the first compartment 23 and the entrance aperture 11 closed; while the second group remains in the first compartment for time T', the exit aperture 12 can be opened and the first group of stunned or killed animals removed. The cycle is repeated from the closure device 22 opening phase.

Such a plant allows the exit motorised conveyor 19 to be re-supplied at time intervals T' shorter than the time T necessary for the animals' stunning or death. Obviously, increasing the number of compartments in cascade allows ever shorter waiting times to be achieved for animals exiting the stunning/slaughter plant.

Figures 11, 12:
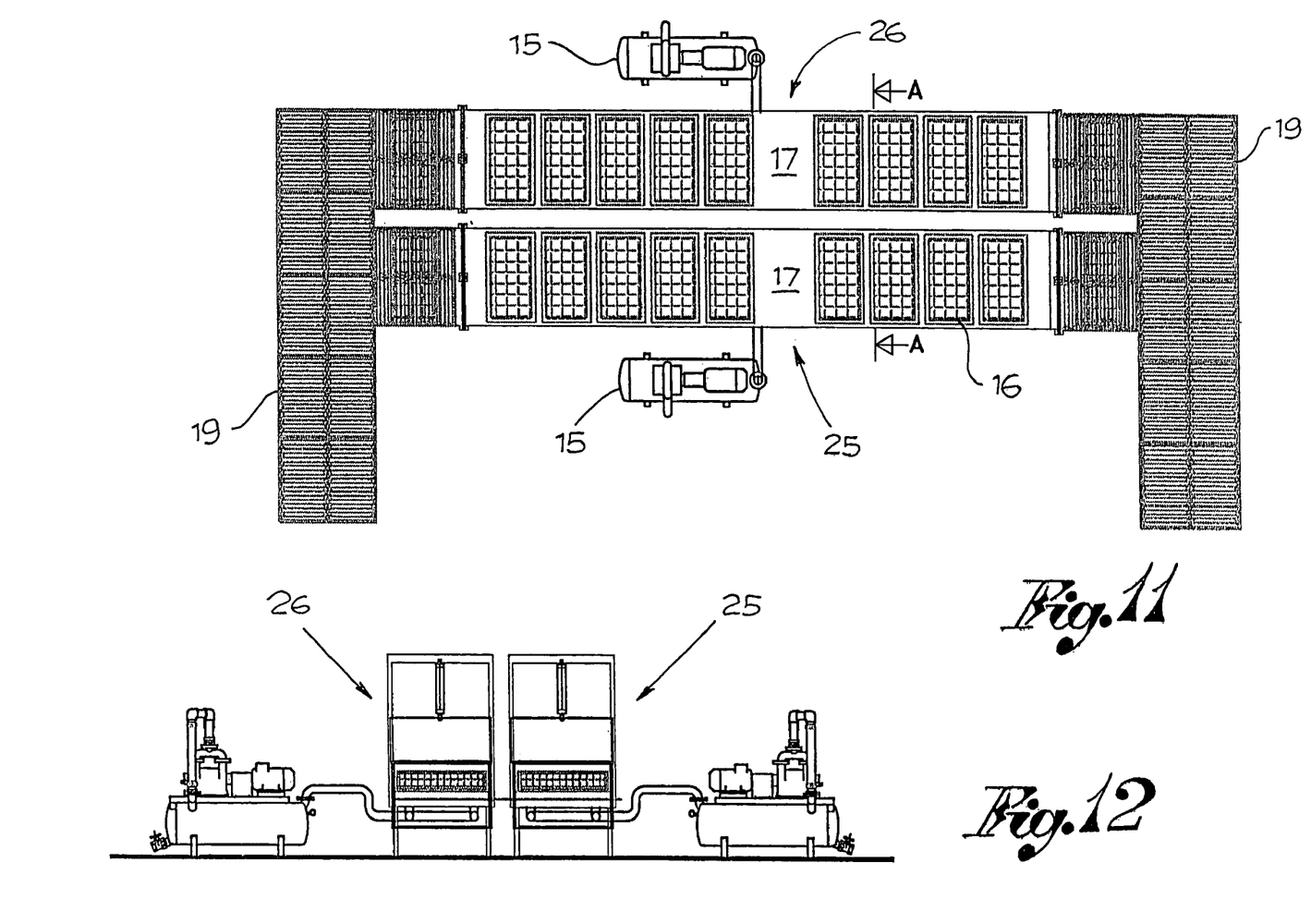
FIG. 11 gives a schematic view from the top of the plant of a final layout.
FIG. 12 shows a cross section of the plant across the line A-A in FIG. 11.

A further variant on the layout is shown in FIGS. 11 and 12, where the hermetically sealable chamber comprises at least two compartments 25, 26 positioned in parallel, that is with each one connected to its own extraction means 15 and having its own entrance and exit apertures with their respective closure devices.

Construction of the chamber 10 with parallel compartments allows phase initiation of successive compartments to be delayed with respect to the first, thus supplying the most continuous possible throughput of stunned or slaughtered animals to the plant exit.

Figure 13:
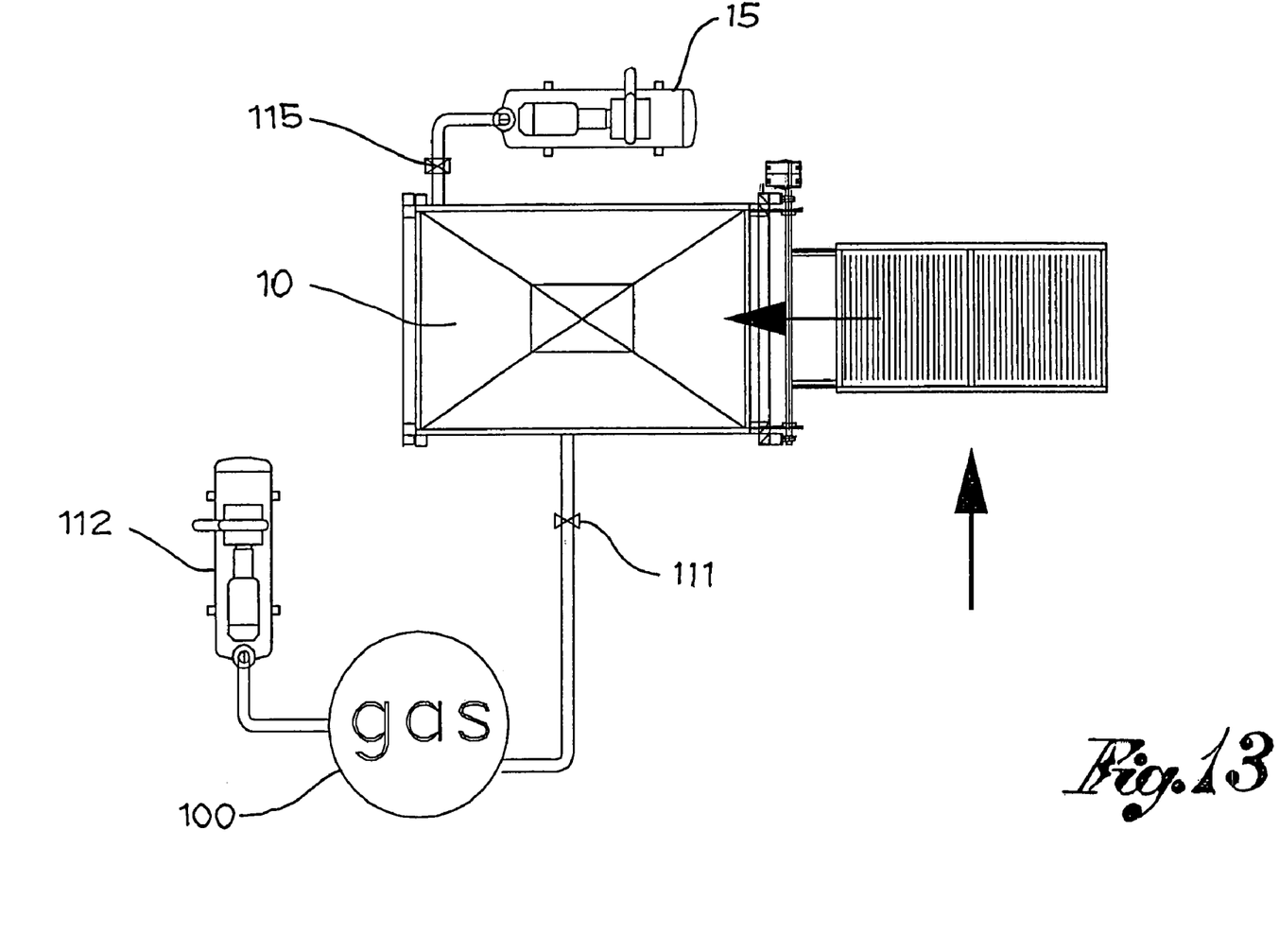
FIG. 13 shows a view of the plant from above in yet another embodiment.

In FIG. 13 is represented, in a general embodiment equivalent to that of FIGS. 1 and 2, a further variation of the plant suitable for slaughtering or stunning animals even more quickly and with less stress.

It has in fact been found that, after creating a vacuum in chamber 10, if a specific quantity of gas is introduced into the chamber, for example carbon dioxide, the animals, by practically breathing pure gas, die sooner and with less trauma.

This variation of embodiment therefore envisages that near sealed chamber 10, besides the pump for creating vacuum 15, along the air intake pipe of which a first on-off valve 115 is provided, a tank 100 be installed containing the gas to be introduced. To the pipe connecting said tank 100 to the chamber 10 a second on-off valve 111 is associated.

Advantageously, to tank 100 is also associated a second suction pump 112. The tank 100 can be connected to a gas storage tank that supplies the tank 100 when the gas inside falls below a preset quantity.

The animal stunning and/or slaughtering cycle is thus implemented.

Once a vacuum has been created in the sealed chamber 10, the first on-off valve 115 is automatically closed and at the same time the second valve 111 is opened which connects the gas tank 100 to chamber 10.

Due to the vacuum created in the chamber, the gas expands immediately in the chamber and thus ensures that the animals breathe virtually pure gas.

Once the animals are stunned or slaughtered, the gas in the chamber is extracted back into the gas tank by the second pump 112. Alternatively, the pump 10 can be used again by fitting a specific air circuit.

In any case, all or part of the gas can be recycled for the next cycle, with considerable economic advantage.

After opening and unloading the stunned or dead animals and reintegration with new live animals, the cycle is repeated.

The extraction and vacuum time required to slaughter or stun the animals, and the quantity of gas introduced are preset and controlled by a PLC depending on the weight of the animals in the sealed chamber.

In all the embodiments described above, the plant advantageously comprises a control unit (not represented) suitable for controlling and synchronising the means of extraction, the closing devices and the motorised transporters.

The capacity of chamber 10, the speed of the transporters and their length are in any case selected according to the slaughtering capacity of the plant in order to ensure as short a time as possible between the death of the animal and throat cutting and bleeding, and in any case the continuity of slaughter line production. In other words, the number of animals in the stunning/slaughtering Plant must be the same or above the number of animals hung in the unit of time on the plant slaughtering line.

It should be noted that the described plant, besides being economically advantageous, is also safer than systems that use gas. In case of a fault, for instance, it is enough to stop the pump to reset normal environmental conditions in just a few seconds, by means of a relief valve, and safeguard the animals in the chamber and the operator in the event of the latter having to intervene.

Finally it should be noted that the plant presented here can, with suitable constructive changes, be used to slaughter or stun other slaughterhouse animals such as pigs and sheep.

Obviously, the man skilled in the art, in order to satisfy specific requirements, may make further changes and variations to the plant according to this invention, all of which are included within the scope of protection of the invention, as defined by the following claims.

What is claimed is:

1. Plant for the stunning and/or slaughter of animals for slaughter, comprising a hermetically sealable chamber with at least one aperture for the introduction of live animals and removal of stunned or slaughtered animals, closure devices to hermetically seal said at least one aperture, and an extraction means to remove air from the chamber in order to stun or slaughter the animals, wherein the hermetically sealable chamber is supplied with at least one intermediate closure device suitable for dividing at least two compartments connected in series and hermetically separable from one another.

2. Plant according to claim 1, in which the hermetically sealable chamber has an entrance aperture for introduction of live animals and an exit aperture for removal of stunned or slaughtered animals, and in which the bottom of the hermetically sealable chamber comprises a motorized conveyor suitable for transporting the animals from the entrance to the exit apertures.

3. Plant according to claim 2, comprising a motorized conveyor suitable for transporting live animals from a loading area to the hermetically sealable chamber.

4. Plant according to claim 3, comprising a motorized exit conveyor suitable for transporting stunned or slaughtered animals from the hermetically sealable chamber to the unloading area.

5. Plant according to claim 4, in which the motorized exit conveyor is lower than the motorized conveyor within the hermetically sealable chamber, and in which the exit aperture closure device comprises a slide which can be activated to rotate between a closed position and an open position in which it connects these conveyors.

6. Plant according to claim 4, comprising a control unit able to activate and synchronize the extraction means, the closure devices and the motorized conveyors.

7. Plant according to claim 3, in which the motorized entrance conveyor is higher than the motorized conveyor within the hermetically sealable chamber, and in which the entrance aperture closure device comprises a slide which can be activated to rotate between a closed position and an open position in which it connects these conveyors.

8. Plant according to claim 1, in which a number of perforated pipelines are positioned inside the hermetically sealable chamber and connected to the extraction means.

9. Plant according to claim 1, in which the extraction means comprises an electric pump.

10. Plant according to claim 1, in which the aperture closure devices are in the form of a rolling shutter.

11. Plant according to claim 1, in which the aperture closure devices are in the form of a revolving door to allow a continuous throughput of animals through the hermetically sealable chamber.

12. Plant according to claim 1, in which the closure devices are actionable by electrical, pneumatic or hydraulic actuators.

13. Plant according to claim 1, in which the hermetically sealable chamber has the form of a tunnel.

14. Plant according to claim 1, in which if N is the number of animals that the processing line after the stunning/slaughtering plant is able to process in one unit of time, and T is the time necessary to stun/slaughter the animals, the hermetically sealable chamber is sized to contain at least N*T animals.

15. Method for stunning and/or slaughter of animals for slaughter using a plant as in claim 1, said method comprising steps of:
   a) introducing a first group of animals into the first compartment;
   b) closing all closure devices;
   c) activating the extraction means;
   d) after time T' shorter than that necessary to stun or kill the animals, opening the intermediate closure device so as to transfer the first group of animals to the second compartment;
   e) closing of the intermediate closure device and opening the entrance aperture;
   f) introducing a second group of animals into the first compartment and closing the entrance aperture;
   g) while the second group of animals remains in the first compartment for time T', opening the exit aperture and removing the first group of animals;
   h) repeating the cycle from phase d).

16. Plant for the stunning and/or slaughter of animals for slaughter, comprising a plurality of hermetically sealable chambers, where each chamber is provided with at least one aperture for the introduction of live animals and removal of stunned or slaughtered animals, closure devices to hermetically seal said at least one aperture, and an extraction means to remove air from the chamber in order to stun or slaughter the animals, wherein said hermetically sealable chambers are supplied with at least one intermediate closure device in series and hermetically separable from one another, and wherein said chambers serve a slaughterhouse processing line and are activatable independently according to a sequence such as to reduce the waiting time of the stunned or slaughtered animals exiting said chambers.

* * * * *